(12) United States Patent
Somanath et al.

(10) Patent No.: US 11,485,520 B2
(45) Date of Patent: Nov. 1, 2022

(54) MATERIAL SELECTION AND OPTIMIZATION PROCESS FOR COMPONENT MANUFACTURING

(71) Applicant: United Technologies Corporation, Farmington, CT (US)

(72) Inventors: Nagendra Somanath, South Windsor, CT (US); Ryan B. Noraas, Hartford, CT (US); Michael J. Giering, Bolton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1056 days.

(21) Appl. No.: 16/104,435

(22) Filed: Aug. 17, 2018

(65) Prior Publication Data

US 2020/0055614 A1   Feb. 20, 2020

(51) Int. Cl.
*G06K 9/00* (2022.01)
*B64F 5/10* (2017.01)
(Continued)

(52) U.S. Cl.
CPC ............ *B64F 5/10* (2017.01); *G05B 19/4097* (2013.01); *G06K 9/6257* (2013.01); *G06N 3/08* (2013.01);
(Continued)

(58) Field of Classification Search
CPC ................ B64F 5/10; G05B 19/4097; G05B 2219/45071; G06K 9/6257; G06N 3/08;
(Continued)

(56) References Cited

U.S. PATENT DOCUMENTS

| 2009/0060388 A1* | 3/2009 | Shingai | G06T 5/004 |
| | | | 382/298 |
| 2011/0013820 A1* | 1/2011 | Reed | G06T 7/60 |
| | | | 382/133 |

(Continued)

OTHER PUBLICATIONS

Yang ("Microstructural Materials Design via Deep Adversairial Learning Methodology", Journal of Mechanical Design, vol. 140, No. 11, May 8, 2018 (May 8, 2018), XP055651221, US ISSN: 1050-0472, DOI: 10.1115/1.4041371) (Year: 2018).*

(Continued)

*Primary Examiner* — Ping Y Hsieh
(74) *Attorney, Agent, or Firm* — Carlson, Gaskey & Olds, P.C.

(57) ABSTRACT

A method for designing a material for an aircraft component includes training a neural network to correlate microstructural features of an alloy with material properties of the alloy by at least providing a set of images of the alloy to the neural network. Each of the images in the set of images has varied constituent compositions. The method further includes providing the neural network with a set of determined material properties corresponding to each image, associating the microstructural features of each image with the set of empirically determined data corresponding to the image, and determining non-linear relationships between the microstructural features and corresponding empirically determined material properties via a machine learning algorithm, receiving a set of desired material properties of the alloy for aircraft component, and determining a set of microstructural features capable of achieving the desired material properties of the alloy based on the determined non-linear relationships.

20 Claims, 4 Drawing Sheets

(51) Int. Cl.
    G05B 19/4097    (2006.01)
    G06K 9/62       (2022.01)
    G06N 3/08       (2006.01)
    G06T 3/40       (2006.01)
    G06T 7/00       (2017.01)
(52) U.S. Cl.
    CPC .............. G06T 3/40 (2013.01); G06T 7/0004 (2013.01); *G06T 2219/45071* (2013.01); *G06T 2207/10024* (2013.01); *G06T 2207/20081* (2013.01); *G06T 2207/20084* (2013.01); *G06T 2207/30136* (2013.01)
(58) Field of Classification Search
    CPC ....... G06N 3/0454; G06T 3/40; G06T 7/0004; G06T 2207/10024; G06T 2207/20081; G06T 2207/20084; G06T 2207/30136; C22C 14/00
    See application file for complete search history.

(56) References Cited

U.S. PATENT DOCUMENTS

| | | | |
|---|---|---|---|
| 2017/0016832 A1* | 1/2017 | Umemura | G01N 21/8914 |
| 2019/0279840 A1* | 9/2019 | Teo | G01N 23/2251 |

OTHER PUBLICATIONS

Shi ("Microstructure-Tensile Properties Correlation for the Ti-6Al-4V Titanium Alloy", Journal of Materials Engineering and Performance, ASM International, Materials Park, OH, US, vol. 24, No. 4, Feb. 24, 2015 (Feb. 24, 2015), pp. 1754-1762, XP035469090 (Year: 2015).*

Noraas, Ryan, et al., Structural Material Property Tailoring Using Deep Neural Networks, AIAA Scitech 2019 Forum, Jan. 7, 2019 (Jan. 7, 2019), XP055671173, Reston, Virginia DOI: 10.2514/6.2019-1703, ISBN: 978-1-62410-578-4.

Nagi, Jawad, et al., Max-pooling convolutional neural networks for vision-based hand gesture recognition, Signal and Image Processing Applications (ICSIPA), 2011, IEEE International Conference on, IEEE, Nov. 16, 2011, (Nov. 16, 2011), pp. 342-347, XP0321 06944, DOI: 10 1109/ICSIPA.2011.6144164 ISBN: 978-1-4577-0243-3.

Zijiang Yang et al., Microstructural Materials Design via Deep Adversarial Learning Methodology, Journal of Mechanical Design, vol. 140, No. 11, May 8, 2018.

Shi Xiaohui et al., Microstructure-Tensile Properties Correlation for the Ti-6Al-4V Titanium Alloy, Journal of Materials Engineering and Performance, ASM International, Materials Park, OH, US, vol. 24, No. 4, Feb. 24, 2015, pp. 1754-1762.

Reddy N S et al., Modeling of titanium alloys by using artificial neural networks, Computational Intelligence and Computing Research (ICCIC), 2010 IEEE International Conference on, IEEE, Dec. 28, 2010, pp. 1-4.

Kar S et al., Modeling the tensile properties in I2-processed I/I2 Ti alloys, Metallurgical and Materials Transactions A, Springer-Verlag, New York, vol. 37, No. 3, Mar. 1, 2006, pp. 559-566.

Ruijin Cang et al., Microstructure Representation and Reconstruction of Heterogeneous Materials via Deep Belief Network for Computational Material Design, arxiv.org, Cornell University Library, 201OLIN Library Cornell University Ithaca, NY 14853, Dec. 22, 2016.

European Search Report for Application No. 19191008.2 dated Jan. 3, 2020.

Summons to attend oral proceedings for European Patent Application No. 19191008.2 dated Aug. 9, 2022.

* cited by examiner

MATERIAL SELECTION AND OPTIMIZATION PROCESS FOR COMPONENT MANUFACTURING

TECHNICAL FIELD

The present disclosure is directed to a process for selecting and optimizing constituent materials of a component for a manufacturing process.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Within the gas turbine engine are multiple distinct components, each of which is subjected to various different loads and thermal stresses. When designing and manufacturing the components, it is important to select the proper material, including the proper underlying microstructures, in order to ensure that the component can withstand the stresses and loads placed upon the component.

SUMMARY OF THE INVENTION

An exemplary method for designing a material for an aircraft component includes training a neural network to correlate microstructural features of an alloy with material properties of the alloy by at least providing a set of images of the alloy, each of the images in the set of images having varied constituent compositions, and providing the neural network with a set of determined material properties corresponding to each image, associating the microstructural features of each image with the set of empirically determined data corresponding to the image, and determining non-linear relationships between the microstructural features and corresponding empirically determined material properties via a machine learning algorithm, receiving a set of desired material properties of the alloy for aircraft component, and determining a set of microstructural features capable of achieving the desired material properties of the alloy based on the determined non-linear relationships.

Another example of the above described exemplary method for designing a material for an aircraft component further includes manufacturing an alloy having the determined set of microstructural features.

Another example of any of the above described exemplary methods for designing a material for an aircraft component further includes manufacturing the aircraft component using the alloy having the determined set of microstructural features.

Another example of any of the above described exemplary methods for designing a material for an aircraft component further includes providing supplementary training to the neural network by providing at least one image of an underlying material of the manufactured component and empirically determined material properties of the component to the neural network.

In another example of any of the above described exemplary methods for designing a material for an aircraft component each image in the set of images is a full size RGB (Red-Green-Blue) image.

Another example of any of the above described exemplary methods for designing a material for an aircraft component further includes resizing each image in the set of images to a plurality of pixel tiles.

In another example of any of the above described exemplary methods for designing a material for an aircraft component each pixel tile represents an approximately equal volume of material.

Another example of any of the above described exemplary methods for designing a material for an aircraft component further includes correlating the set of empirically determined data with each corresponding pixel tile.

In another example of any of the above described exemplary methods for designing a material for an aircraft component the set of images includes at least 500 images.

In another example of any of the above described exemplary methods for designing a material for an aircraft component the empirically determined material properties include Young's modulus (E), Poisson's ratio, yield strength (Y) and a thermos-elastic strain (ms).

In another example of any of the above described exemplary methods for designing a material for an aircraft component the set of determined material properties corresponding to each image includes empirically determined data corresponding to each image.

In one exemplary embodiment a system for automatically determining microstructural features includes a computer system having an image set input and a non-visual data input and a memory and a processor, the memory storing instructions for operating a neural network, wherein the neural network is trained to correlate microstructural features of an alloy with material properties of the alloy by at least receiving a set of images of the alloy at the image set input, each of the images in the set of images having varied constituent compositions, and receiving a set of empirically determined material properties corresponding to each image at the non-visual data input, associating the microstructural features of each image with the set of empirically determined data corresponding to the image, and determining non-linear relationships between the microstructural features and corresponding empirically determined material properties via a machine learning algorithm, the computer system further including a third input configured to receive a set of desired material properties of the alloy for aircraft component, wherein the memory includes instructions for causing the neural network to determine a set of microstructural features capable of achieving the desired material properties of the alloy based on the determined non-linear relationships, and an output configured to output the determined set of microstructural features.

In another example of the above described system for automatically determining microstructural features the determined set of microstructural features includes at least one of a grain size, a grain morphology, a precipitate size, a grain spacing, and an alloy composition.

In another example of any of the above described systems for automatically determining microstructural features the determined set of microstructural features includes each of the grain size, the grain morphology, the precipitate size, the grain spacing, and the alloy composition.

In another example of any of the above described systems for automatically determining microstructural features the neural network is configured to receive supplementary training by receiving at least one image of an underlying material of a manufactured component and empirically determined material properties of the manufactured component.

In another example of any of the above described systems for automatically determining microstructural features each image in the set of images is a full size RGB (Red-Green-Blue) image.

In another example of any of the above described systems for automatically determining microstructural features the neural network is configured to resize each image in the set of images to a plurality of pixel tiles.

In another example of any of the above described systems for automatically determining microstructural features each pixel tile represents an approximately equal volume of material.

In another example of any of the above described systems for automatically determining microstructural features the neural network is configured to correlate the set of empirically determined data with each corresponding pixel tile.

In another example of any of the above described systems for automatically determining microstructural features the empirically determined material properties include Young's modulus (E), Poisson's ratio, yield strength (Y) and a thermos-elastic strain (ms).

These and other features of the present disclosure can be best understood from the following specification and drawings, the following of which is a brief description.

DETAILED DESCRIPTION OF AN EMBODIMENT

Figure 1:
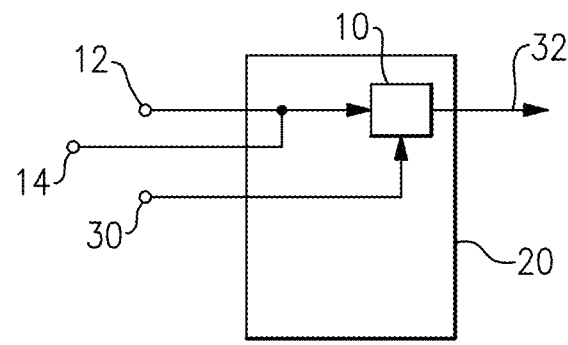
FIG. 1 illustrates an exemplary process for training an advanced neural network

When selecting a material for a gas turbine engine component, or any other component that may be subjected to extreme stresses and loads, it is important to ensure that the material composition including any underlying material constituents achieves the necessary material properties for the component to withstand the environment that the component is operating in.

Some materials, such as Aluminum (Al)-Titanium (Ti) based alloys, and other alpha-beta variants, have a combination of high strength-to-density ratio, high hardness, and good resistance to stress corrosions and are generally desirable for high-pressure aerospace applications. Certain features of an alloy, such as workability and localized residual strain retention, can reduce the life of the component constructed of the material. In alternative examples, the methods and processes described herein could be applied to all alloys in general and are not limited to Al—Ti based alloys or to alpha-beta alloys.

To improve the workability and plasticity of the alloys, the design and deformation process is optimized with consideration for the alloy composition and grain refinement information. The flow stress and microstructure evolution of a material during plastic deformation can be determined using a constitutive equation containing stress, strain, strain rate, and deformation temperature. This equation can, in turn, be utilized to determine if a given material composition is suitable for a given component application without requiring prototyping and testing of actual components or material samples.

In some examples, process physics constitutive models based on ASTM (American Society for Testing and Materials) test methods provide an accurate description of deformation behavior and are used in wide ranges of strain rate and materials temperature characterizations. The characterizations are used to validate test results, and to correlate predictive material property models with actual material properties of a material having specific material constituents. The validated test results and the predictive material property models are then used to create the above-described constitutive equation(s).

The strain rates and material properties of a given alloy can vary based on the constituent percentage of the underlying materials as well as other microstructural features. By way of example, an Al—Ti alloy can have varying material properties depending on the percentage of Al and the percentage of Ti within the alloy. Thus, the alloy composition is a key aspect of designing a component material for a particular application and environment. The local location variations in chemical composition of a component can further influence the resultant material properties. By way of example, regions of a component may be soft, relative to a remainder of the component, if the local region includes an excess percentage of a softer alloy material as opposed to the percentage of the harder alloy material.

In addition, the constituent composition can also influence material properties like Young's modulus (abbreviated: E), tensile strength (abbreviated: Y), strain rate, HCF (high cycle fatigue) and creep behavior. E is directly an estimate of stiffness of the component. Each of these material properties can be critical in high strength, high temperature, high-pressure operations, such as the operations that an aircraft component is exposed to. It is understood that E is inversely proportional to deflection, so a lower modulus results in higher deflection for the same applied stress. Higher yield strength Y will increase the load bearing capacity of the component constructed from the alloy. A higher thermo-elastic strain (ms) enhances the capability of the material to withstand rupture and thus, enhances the part life of the component constructed of the material.

Further impact of the material constituents is observed when an alloy system is deformed due to an application of a load. Dynamic recovery is one primary softening mechanism of aluminum (Al) based alloys, which are typically metallic materials with a high stacking fault energy. Dynamic recovery and the cyclical hysteresis of the local load leads to shifting microstructures that can lead to material softening over time and repeated load cycles. Dynamic recrystallization in aluminum alloys corresponds to high deformation temperatures and low strain rates.

Disclosed herein is a systematic approach for using a deep learning neural network that is trained from micro-constituent data from micrographs, or any other suitable image, to identify microstructural features in image-data that are relevant to the material property of a given alloy that is being evaluated. The microstructure image and associated properties are paired and used to train a deep learning neural network. The resulting neural network identifies non-linear relationships between visual microstructural features and corresponding material properties, and provides optimization or verification equations based on those non-linear relationships. While theoretical models for computing properties of a given microstructure may be known for any given alloy, determining a microstructure based on a set of desired properties is difficult or impossible using conventional models.

The systematic approach described herein utilizes a deep learning based approach to train a neural network capable of generating a particular microstructure having a set of user-specified material properties. By providing a sufficiently large data set of microstructure images, and the corresponding material properties, as determined via ASTM testing, the neural network can plot the non-linear relationships and organically develop predictive multi-dimension equations for determining a microstructure based on a set of desired material properties.

The microstructure design is performed by tailoring the distribution of various features within the microstructures (e.g. grain size, morphology, precipitate size, spacing, and the like) to achieve a desired microstructure. The structural optimization is carried out along multiple crystallographic directions as determined by the neural network in order to attain favorable properties. The utilization of the deep learning advanced neural networks addresses the high dimensionality micro-constituent shape design space by searching in a multi-dimensional space of all possible constituent orientation distributions and converging the results. Due to the number and variety of underlying microstructure constituents, the space being searched in includes a substantially large number of dimensions and would be prohibitively complex to solve without the aid of a computer. In one example, the space can include greater than 100 dimensions. The number of dimensions (alternatively referred to as degrees of freedom) of the material optimization is infinite. However, in a practical implementation the search space can be reduced to include factors such as: Chemistry (up to 10-15 elements in super alloys), solution heat treatment temperature & cooling rate, quench delay time, forging process temperature, strain rates, induced strain (work), stress relief heat cycles, stabilization and aging temperatures and time. The listed factors are purely exemplary and are not exhaustive or limiting in scope.

By optimizing the constituent materials under a constraint requirement of multiple, possibly conflicting, extremal properties, and by merging these factors into a complete material constituent design space, the neural network can convert an input set of material properties for a component to a set of microstructural features able to meet the required material properties.

FIG. 1 illustrates an exemplary process for training an advanced neural network 10 contained within a computer system 20. The computer system 20 can be a single computer, a network of computers including distributed processing, or any other similar computational system. A set of images (FIG. 2) of alloy microstructures for an alloy being trained are provided to the neural network 10 via an image input 12. Simultaneous to the input of the images, is an input of known data describing the material properties of those images at a material properties input 14. The materials property data is determined empirically via ASTM testing, or any other validated testing system. The materials property data is correlated with the image data by the computer system 20 using the neural network 10. The neural network 10 identifies the visual microstructure features of each material based on the corresponding image(s), and empirically determined data is mapped with the determined microstructural features In some examples, the neural network 10 requires at least 1000 data points to be sufficiently trained in a given alloy, with each data point including an image of a material microstructure, and the corresponding material properties. Once adequately trained, the neural network 10 is capable of determining a microstructure required to achieve a desired set of material properties, or to predict the material properties of a microstructure without requiring empirical testing.

To achieve the microstructure design element, a technician inputs a set of desired material properties for an aircraft component being designed via an input 30. Once the set of desired material properties is received, the neural network 10 uses organically developed predictive equations defining non-linear relationships between microstructural features and material properties, and the multi-dimensional space analysis to determine a constituent microstructure that is capable of achieving the desired material properties. The determined constituent microstructure is then output to the technician via an output 32. In some examples, the technician then determines a corresponding manufacturing process and constructs a component from the material having the determined microstructural features. In alternative examples, the neural network can also be used to output a manufacturing process that could theoretically produce the generated and optimal microstructure. Once output, technicians and metallurgists could verify or modify the suggested manufacturing process as seen fit.

In some examples, once the output material has been constructed according to the output microstructure, a sample of the material is tested, and the testing results and image of the sample can be uploaded to the neural network 10 via the inputs 12, 14 to further train the neural network 10.

Figure 2:
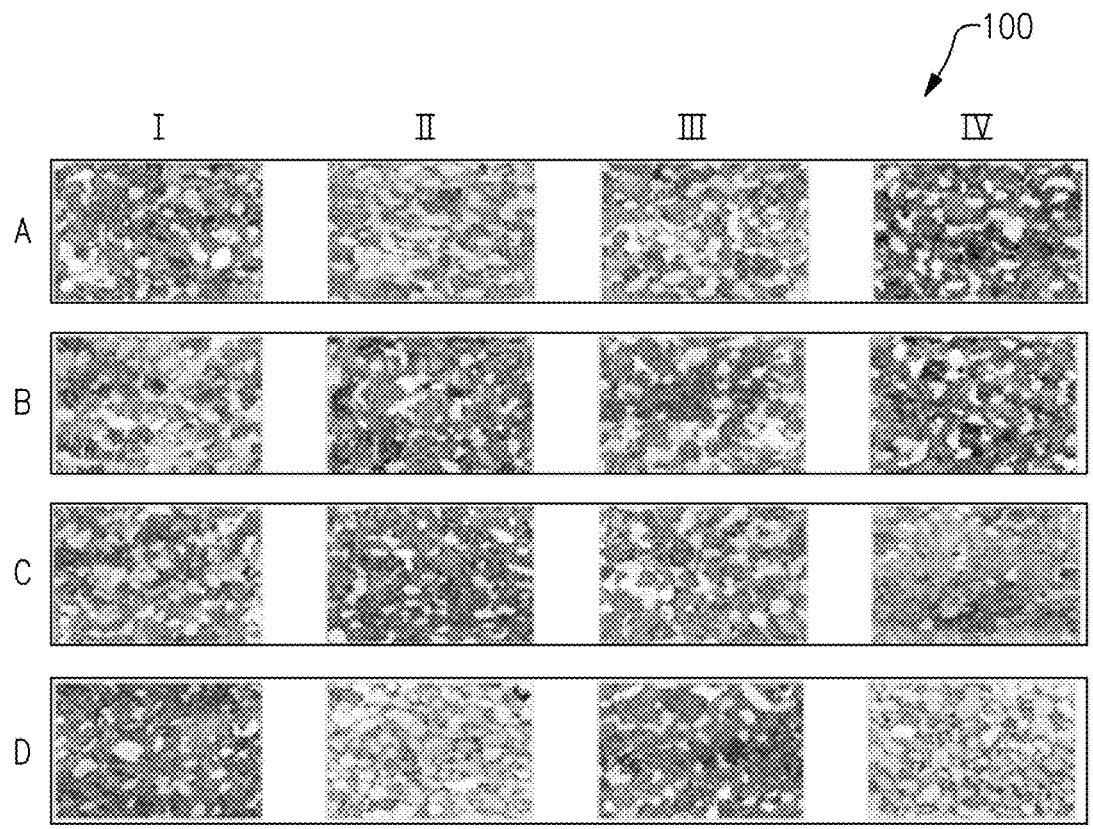
FIG. 2 schematically illustrates an exemplary image data set.
Figure 3:
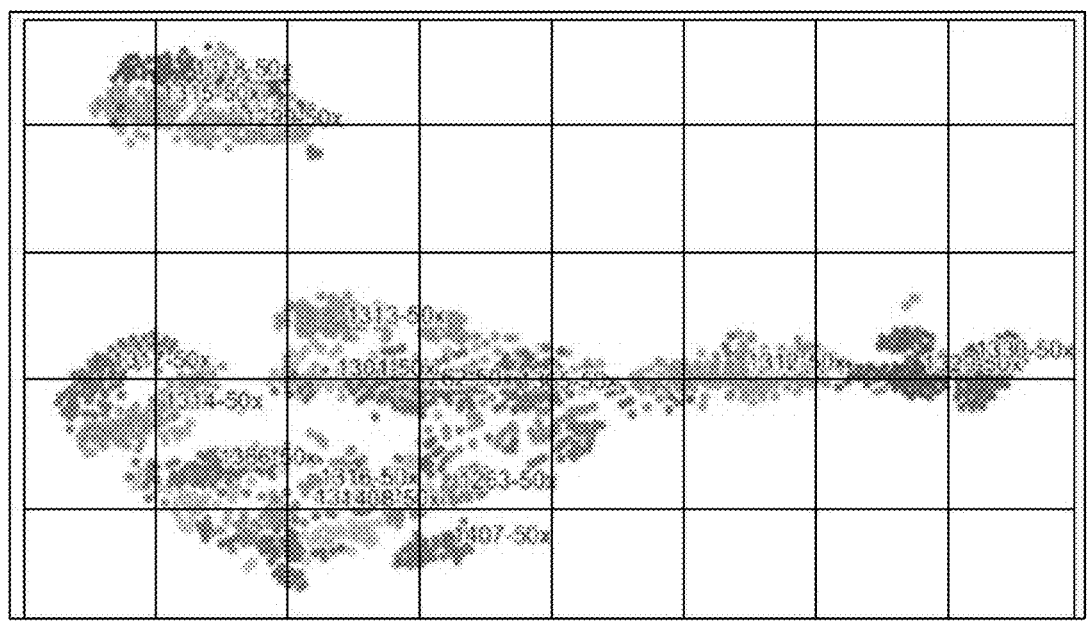
FIG. 3 illustrates a reduced order visualization of a model layer output of the machine-learning algorithm via a T-distributed Stochastic Neighbor Embedding (t-SNE) plot.
Figure 4:
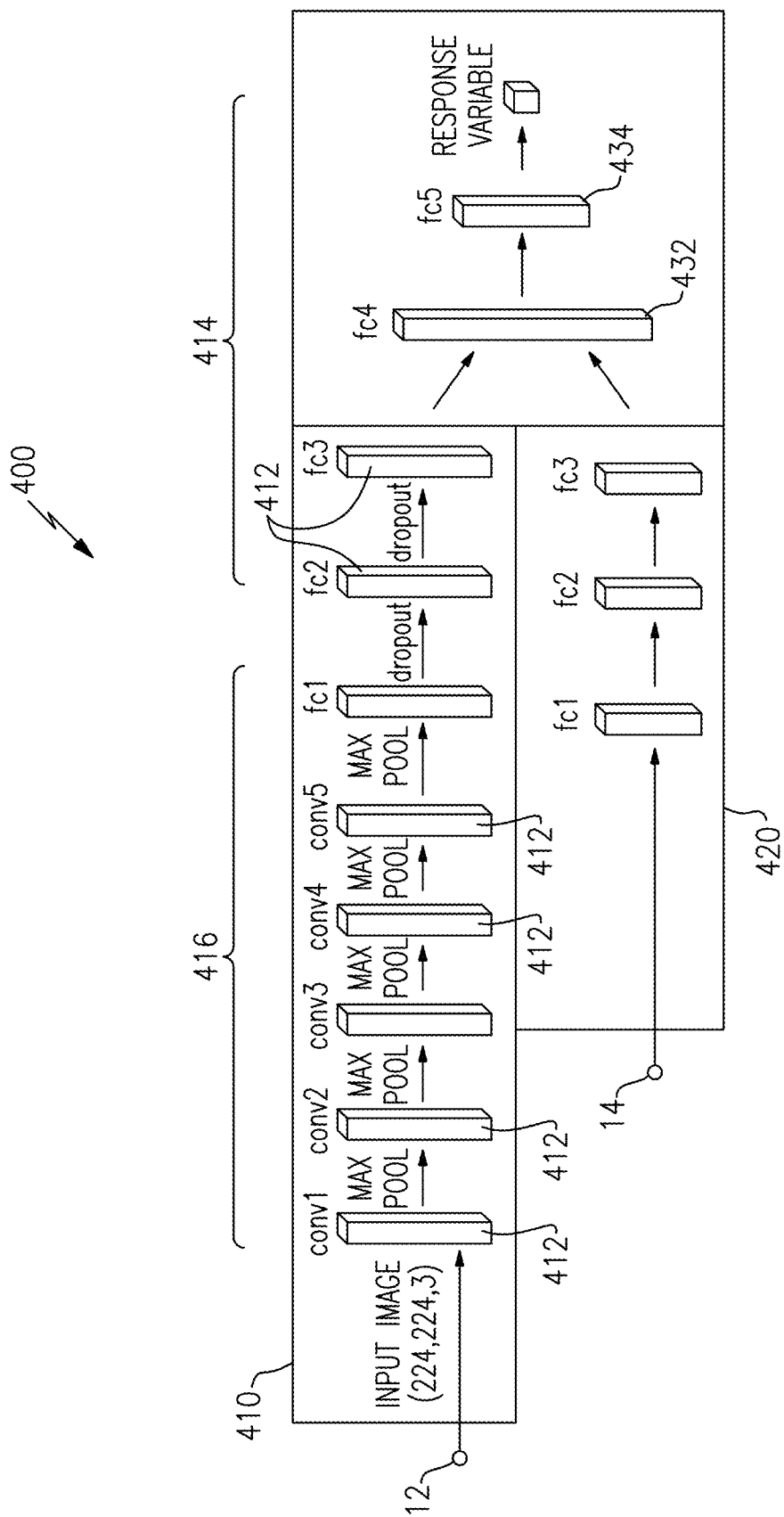
FIG. 4 illustrates an exemplary machine learning process for the image set of FIG. 2.
Figure 5:
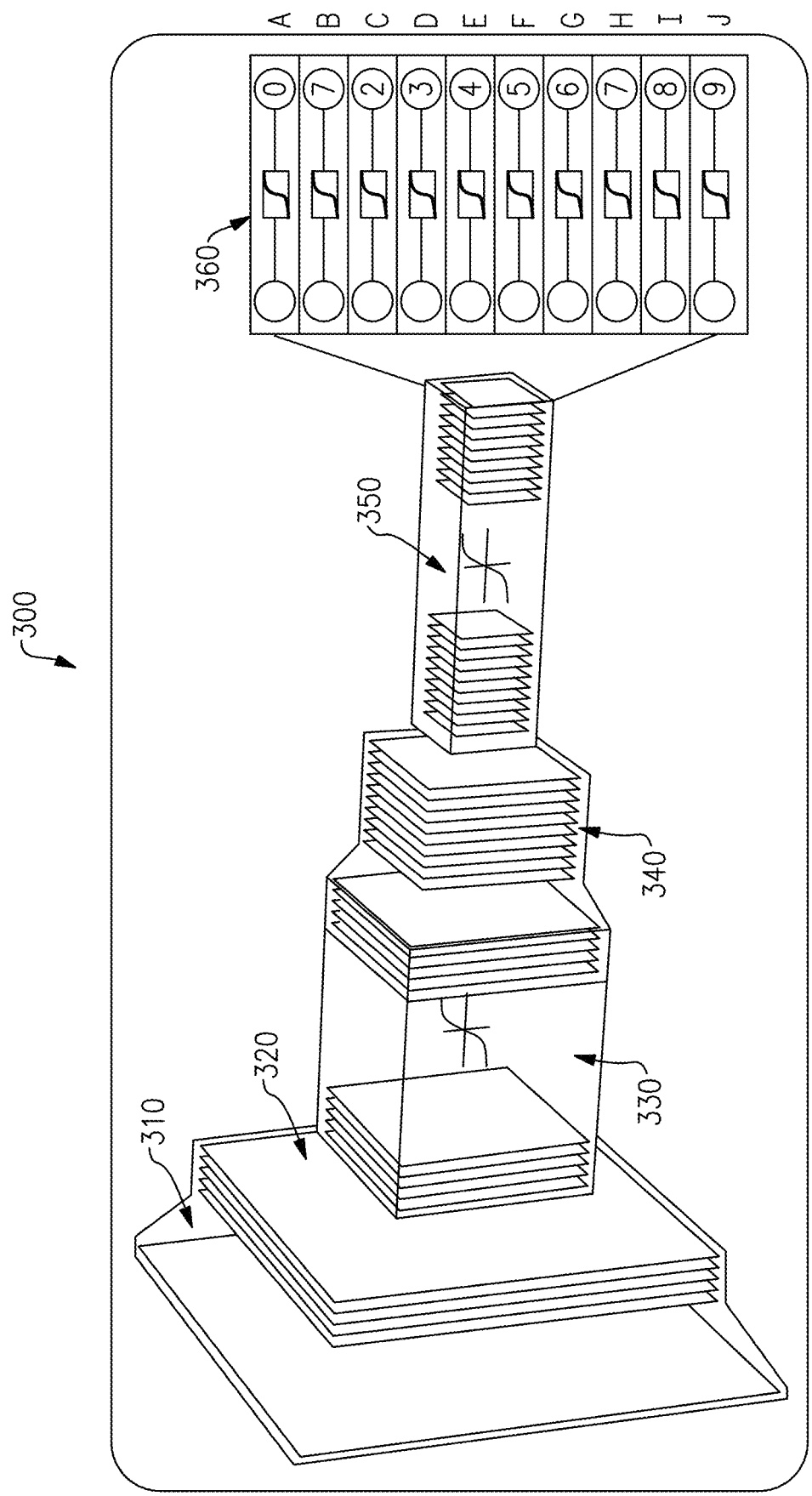
FIG. 5 illustrates a top-level diagram of the training process.

FIG. 2 illustrates an exemplary input image set 100 including sixteen images (illustrated in grid form on positions AI-DIV) of various microstructures of a Ti-6Al-4V alloy. In a practical embodiment, substantially more than sixteen images can be used to train the neural network 10. While the Ti-6Al-4V alloy is used in the exemplary embodiment, the same training process and neural network principles apply to, and can be used with, any similar alloy. Along with the images AI-DIV, a set of material properties, or a composite value of multiple material properties, is input for each image AI-DIV. In one example, the material properties include Young's modulus (E), Poisson's ratio, yield strength (Y) and a thermos-elastic strain (ms). In any example, all of the properties are conventional material characteristics and can be measured from a material sample using standard ASTM tests, or any other validated testing system. The images AI-DIV form a 2D image dataset, and the deep learning neural network 10 automatically learns what spectral features correlates with what material properties via alternating convolutional and max pooling layers to learn what visual features in the image correlate with target response. A T-distributed Stochastic Neighbor Embedding (t-SNE) plot 200, of the exemplary data set 100 of FIG. 2 is illustrated in FIG. 3 and is a reduced order visualization of a model layer output of the machine-learning algorithm.

With continued reference to FIGS. 1-3, FIG. 4 illustrates a training process 400 utilized to train the neural network 10 according to one exemplary process. The data provided to the neural network 10 is broken into two sets of data, the first set 410 of data is received via the image input 12 and the second set 420 of data is received via the additional data input 14. Within the first set 410 of data are multiple parameters 412, and the parameters 412 can be broken down into further sets of trainable parameters 414 and non-trainable parameters 416. Certain layers and weights in the model are effectively "frozen" and not allowed to update during training, these layers are the non-trainable parameters 416. The learning process only allows a select number of layers/weights to update during training. This is referred to as transfer learning.

Each of the images AI-DIV is a full size RGB (Red-Green-Blue) image. The RGB images can be captured using any number of different techniques, the details of which are not limiting on the present disclosure. Further, in alternative examples, other image formats aside from RGB images can be used to similar effect. When provided to the neural network, the images AI-DIV are resized to 224×224×3 pixel tiles. The resizing is performed in consideration of the volume of material that is represented by the image (referred to as the representative volume element). In this way each final 224×224×3 pixel tile represents an approximately equal volume of material. Each of the tiles are then pre-processed using a statistical centering process, and provided to the neural network training. An organic learning process (described above with regards to FIG. 4) is utilized to determine the non-linear relationships between the microstructural features and the corresponding material properties, with each layer of the organic learning process determining additional parameters 412 based on the determined non-linear relationships. While a specific process, image type, and pixel tile size is described in an exemplary embodiment, it should be understood that the specific details could be modified as needed and still fall within the present disclosure.

The resultant non-linear relationships are output and merged with a distinct theoretical model incorporating the user specified non-determinable parameters 420 for a set of trained predictive equations 432, 434. The trained predictive equations can be utilized as described above with regards to FIG. 4 to determine an optimized, or a feasible, constituent material for a component based on the material properties that the component is required to have.

With continued reference to FIGS. 1-4, FIG. 5 schematically illustrates two levels of the organic learning process 300 for the neural network described above. The image data set 100 of FIG. 2 is represented via data set 310, and the corresponding material properties are represented via data set 320. The neural network 10 then identifies non-liner relationships between the data 310 of the microstructures shown in the images, and the data 320 of corresponding material properties.

In some example, further corresponding data 340, such as testing data that cannot be determined from images alone such as test stress, temperature, strain rate, R-ratio, Kt, and the like, can be converged with the non-linear relationships 330 to form a second set of non-linear relationships 350. Each time the data is converged to form a new set of non-linear relationships 330, 350 the resultant relationships are referred to as a layer. Based on either the highest set of non-linear relationships 330, or the highest two sets of non-linear relationships 330, 350, a set of predictive equations 360A-J is developed. Each of the predictive equations maps one, or more, of the non-linear relationships and can provide a desired constituent material (e.g. grain size) corresponding to a desired material property (e.g. tensile strength). When a full set of desired material properties is entered, the neural network 10 can solve the system of equations 360A-J for the entire material properties to determine an underlying material constituency to generate an alloy having the desired material properties. In alternative examples, substantially more than two layers can be applied, with the trained predictive equations only be determined by a subset of the layers, with the subset being the last sequential layers. In some examples, only the highest one or two layers is used to generate the predictive equations.

Figure 6:
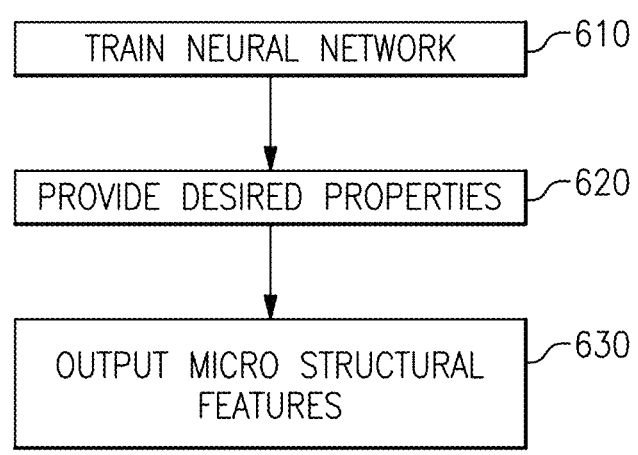
FIG. 6 schematically illustrates an exemplary process for designing an aircraft component material utilizing the neural network of FIG. 1.

With reference to all of the above described Figures, FIG. 6 illustrates a process for generating an aircraft engine component having a set of desired material properties based on information provided by the neural network 10 described herein. Initially, the neural network is trained, as described above, by providing a sufficient number of samples in a "Train Neural Network" step 610. In some examples, the number of samples provided to train the neural network is at least 500. In alternative examples, the number of samples can be at least 5000.

Once trained, a technician determines a desired set of material properties and a desired alloy for a given component, and numerically quantizes the properties. In one example, the desired material properties include Young's modulus (E), tensile strength (Y), strain rate, HCF and creep behavior The quantized properties are provided to the neural network in a "Provide Desired Properties" step 620. The neural network then applies the determined non-linear relationships and outputs a set of microstructural features of the desired alloy that would be capable of meeting the desired properties in an "Output Microstructural Features" step 630.

Optionally, the neural network can further output a procedure for creating the underlying component material with the determined microstructural features.

Once the microstructural features have been output, the user converts those features into a process for achieving the features, and creates the aircraft component with the underlying microstructural features.

In some examples, the created material, or a sample of the created material, can be subjected to standardized ASTM testing and the resultant images and testing data can be provided back to the neural network to further train the system.

It is further understood that any of the above-described concepts can be used alone or in combination with any or all of the other above described concepts. Although an embodiment has been disclosed, a worker of ordinary skill in this art would recognize that certain modifications would come within the scope of this disclosure. For that reason, the following claims should be studied to determine the true scope and content of this disclosure.

The invention claimed is:

1. A method for designing a material for an aircraft component comprising:
training a neural network to correlate microstructural features of an alloy with material properties of the alloy by at least providing a set of images of the alloy, each of the images in the set of images having varied constituent compositions, and providing the neural network with a set of determined material properties corresponding to each image, associating the microstructural features of each image with the set of empirically determined data corresponding to the image, and determining non-linear relationships between the microstructural features and corresponding empirically determined material properties via a machine learning algorithm;
receiving a set of desired material properties of the alloy for aircraft component;

determining a set of microstructural features capable of achieving the desired material properties of the alloy based on the determined non-linear relationships; and wherein the neural network comprises an alternating convolutional and max pooling layers architecture, and the correlation process is at least partially based on a transfer learning process including a non-trainable parameter and a trainable parameter.

2. The method of claim 1, further comprising manufacturing an alloy having the determined set of microstructural features.

3. The method of claim 2, further comprising manufacturing the aircraft component using the alloy having the determined set of microstructural features.

4. The method of claim 3, further comprising providing supplementary training to the neural network by providing at least one image of an underlying material of the manufactured component and empirically determined material properties of the component to the neural network.

5. The method of claim 1, wherein each image in the set of images is a full size RGB (Red-Green-Blue) image.

6. The method of claim 1, further comprising resizing each image in the set of images to a plurality of pixel tiles.

7. The method of claim 6, wherein each pixel tile represents an approximately equal volume of material.

8. The method of claim 7, further comprising correlating the set of empirically determined data with each corresponding pixel tile.

9. The method of claim 1, wherein the set of images includes at least 500 images.

10. The method of claim 1, wherein the empirically determined material properties include Young's modulus (E), Poisson's ratio, yield strength (Y) and a thermos-elastic strain (ms).

11. The method of claim 1, wherein the set of determined material properties corresponding to each image includes empirically determined data corresponding to each image.

12. The method of claim 1, wherein the empirically determined material properties include Young's modulus (E), Poisson's ratio, yield strength (Y) and a thermos-elastic strain (ms).

13. A system for automatically determining microstructural features comprising:
a computer system having an image set input and a non-visual data input and a memory and a processor, the memory storing instructions for operating a neural network, wherein the neural network is trained to correlate microstructural features of an alloy with material properties of the alloy by at least receiving a set of images of the alloy at the image set input, each of the images in the set of images having varied constituent compositions, and receiving a set of empirically determined material properties corresponding to each image at the non-visual data input, associating the microstructural features of each image with the set of empirically determined data corresponding to the image, and determining non-linear relationships between the microstructural features and corresponding empirically determined material properties via a machine learning algorithm and wherein the neural network comprises an alternating convolutional and max pooling layers architecture, and the correlation process is at least partially based on a transfer learning process including a non-trainable parameter and a trainable parameter;
the computer system further including a third input configured to receive a set of desired material properties of the alloy for aircraft component, wherein the memory includes instructions for causing the neural network to determine a set of microstructural features capable of achieving the desired material properties of the alloy based on the determined non-linear relationships; and
an output configured to output the determined set of microstructural features.

14. The computer system of claim 13, wherein the determined set of microstructural features includes at least one of a grain size, a grain morphology, a precipitate size, a grain spacing, and an alloy composition.

15. The computer system of claim 14, wherein the determined set of microstructural features includes each of the grain size, the grain morphology, the precipitate size, the grain spacing, and the alloy composition.

16. The computer system of claim 13, wherein the neural network is configured to receive supplementary training by receiving at least one image of an underlying material of a manufactured component and empirically determined material properties of the manufactured component.

17. The computer system of claim 13, wherein each image in the set of images is a full size RGB (Red-Green-Blue) image.

18. The computer system of claim 17, wherein the neural network is configured to resize each image in the set of images to a plurality of pixel tiles.

19. The computer system of claim 18, wherein each pixel tile represents an approximately equal volume of material.

20. The computer system of claim 19, wherein the neural network is configured to correlate the set of empirically determined data with each corresponding pixel tile.

* * * * *